United States Patent
Karpov et al.

(10) Patent No.: US 10,761,040 B2
(45) Date of Patent: Sep. 1, 2020

(54) PLANAR THERMOCATALYTIC SENSOR OF COMBUSTABLE GASES AND VAPOURS

(71) Applicant: ROSNEFT OIL COMPANY, Moscow (RU)

(72) Inventors: Evgeny Evgenievich Karpov, Moscow (RU); Alexey Pavlovich Karelin, Moscow (RU); Alexey Anatolievich Suchkov; Ilya Vladimirovich Roslyakov, Kirovskaya obl. (RU); Irina Valerievna Kolesnik, Moscow (RU); Kirill Sergeevich Napolskii, Moscow (RU)

(73) Assignee: ROSNEFT OIL COMPANY, Moscow (RU)

( * ) Notice: Subject to any disclaimer, the term of this patent is extended or adjusted under 35 U.S.C. 154(b) by 379 days.

(21) Appl. No.: 15/570,039

(22) PCT Filed: Apr. 26, 2016

(86) PCT No.: PCT/RU2016/000244
§ 371 (c)(1),
(2) Date: Oct. 27, 2017

(87) PCT Pub. No.: WO2016/175681
PCT Pub. Date: Nov. 3, 2016

(65) Prior Publication Data
US 2018/0128760 A1   May 10, 2018

(30) Foreign Application Priority Data
Apr. 29, 2015   (RU) ................. 2015116151

(51) Int. Cl.
*G01N 25/38*   (2006.01)
*G01N 25/32*   (2006.01)
(Continued)

(52) U.S. Cl.
CPC .......... *G01N 25/385* (2013.01); *G01N 25/32* (2013.01); *G01N 27/128* (2013.01); *G01N 27/14* (2013.01)

(58) Field of Classification Search
CPC .................................................. G01N 25/385
See application file for complete search history.

(56) References Cited

U.S. PATENT DOCUMENTS

| | | | |
|---|---|---|---|
| 2002/0118027 A1 | 8/2002 | Routkevitch et al. | |
| 2013/0285682 A1* | 10/2013 | Biskupski | G01N 27/4075 324/693 |

FOREIGN PATENT DOCUMENTS

| | | |
|---|---|---|
| CN | 86106172 | 6/1987 |
| CN | 102967641 | 3/2013 |

(Continued)

*Primary Examiner* — Daniel S Larkin
(74) *Attorney, Agent, or Firm* — Carmody Torrance Sandak & Hennessey LLP

(57) ABSTRACT

The invention relates to gas analysis and to combustible gas and vapour analyzers based on a thermocatalytic operating principle. The subject of the invention is a sensor the sensitive elements of which are manufactured by planar techniques that can be easily automated. The main distinguishing feature is that a working sensitive element and a reference sensitive element are colocated in a single micron-sized structural component (a microchip) on a common substrate made of porous anodic aluminium oxide. The design of the sensitive elements provides for film-wise heat transfer from heated parts of the working and reference sensitive elements. Measuring microheaters which heat the working and reference sensitive elements up to working temperatures and provide for differentially measuring an output signal in a measuring bridge circuit are spaced apart at opposite sides of the anodic aluminium oxide substrate and are disposed on arms projecting beyond the common substrate configuration. The sensitive elements are disposed (Continued)

in a reaction chamber having restricted diffusion access via a calibrated orifice, and the diameter of regular pores in the microchip substrate is increased to sizes that provide for a predominantly molecular diffusion mode in the pores (100 nm or more).

13 Claims, 4 Drawing Sheets

(51) Int. Cl.
*G01N 27/12* (2006.01)
*G01N 27/14* (2006.01)

(56) References Cited

FOREIGN PATENT DOCUMENTS

| | | |
|---|---|---|
| CN | 103604853 | 2/2014 |
| CN | 103954665 | 7/2014 |
| CN | 103954670 | 7/2014 |
| CN | 104359959 | 2/2015 |
| EP | 703449 | 3/1996 |
| RU | 48639 | 10/2005 |
| RU | 2447426 | 4/2012 |
| RU | 2531022 | 10/2014 |
| SU | 787973 | 1/1980 |

* cited by examiner

PLANAR THERMOCATALYTIC SENSOR OF COMBUSTABLE GASES AND VAPOURS

TECHNICAL FIELD OF THE INVENTION

The present invention relates to devices for gas analysis of combustible gases and vapours based of thermocatalytic principle, more particular to sensors of such devices.

In literature there are several names being synonyms of the term "thermocatalytic sensor" such as "thermocatalytic detector," "thermocatalytic primary transducer," "thermocatalytic gas-measuring head" [Karpov E. F., Basovsky B. I., Control of ventilation and outgassing in coal mines. Handbook. Moscow, 'Nedra' Publisher, 1994]. All these terms give an accurate representation of functions performed by the devices and may include only sensitive elements placed inside an explosion-proof casing and protected against dust and turbulent flows of a gas-air mixture to be analyzed, or may additionally include partially or entirely a circuitry of the sensor device.

In the present invention, implied under the term "thermocatalytic sensor" is the most common sensor design including a cylindrical housing or a housing of another shape with unilateral diffusion access of the gas-air mixture to be analyzed through a porous gas-exchange filter, the mixture firstly entering a buffer chamber which facilitates, together with the gas-exchange filter, ripple smoothing of a turbulent external flow. Then, a smoothed, laminar flow enters a reaction chamber provided with a working sensitive element and a reference sensitive element, usually of pellistor type.

The working sensitive element (SE) consists of a heating and measuring platinum coil embedded in porous ceramics of $\gamma$-alumina coated with a catalytically active coating. The reference SE has a similar design as that of the working SE, but has no catalytically active coating. The sensing elements are integrated in one branch of a measuring bridge circuit. Another branch of the bridge circuit is usually located on the common circuit board of the gas analyzer.

PRIOR ART

The thermocatalytic principle-based gas analyzers have found a wide application thanks to simplicity of the main design options and, as a result, due to maintenance simplicity and a lower price of products (gas detectors, gas analyzers) in comparison with devices based on another functional concept.

However, thermocatalytic sensors have several shortcomings such as an alteration of pore structure of the support in time and, as a consequence, of catalytic activity of the working SE, which both result in a progressive drop of sensitivity and in shortening of metrological calibration periods. Another shortcoming of pellistor-type (volumetric) thermocatalytic sensors is heavy manual labor costs in manufacturing of the working and reference sensitive elements and an impossibility to guarantee the identity of their parameters and characteristics, which makes it necessary to perform additional operations for selecting pairs of the elements after their manufacture.

A further shortcoming is a decrease in catalytic activity of the working sensitive elements during their exposure to "catalyst poisons," first of all, to widespread organosilicon compounds comprised in various adhesives, paints, varnishes, etc.

Development of thin-film technologies (including photolithography and various vacuum deposition methods) widely used in the microelectronic industry gave rise to the development of planar thermocatalytic sensors.

One thermocatalytic sensor of planar type is known from the prior art, whose sensitive element manufacture technology and sensor structure are disclosed in the patent Applications publication No. US 2002/0118027 A1 [Aug. 29, 2002 (Dmitri Routkevitch et al., Nanostructured ceramic platform for micromachined devices and device arrays)]. In this prior art document, similar to the claimed solution, a small-size thin porous substrate made of anodic aluminium oxide (anodic alumina, AA) is used as a support for the sensitive elements. The microheater is made as a thin platinum film of U-shaped configuration. The sensing elements are arranged in a reaction chamber which is located inside a sensor housing and communicates with the atmosphere to be analyzed via a gas-exchange filter. These known solutions permit to reduce energy consumption, to provide the identity of parameters of the sensitive elements as compared to the pellistor-type sensitive elements manufactured by 3D techniques.

A shortcoming of such sensors is that an extremely thin metal layer which does not close channels of the porous substrate is to be used as the heater. Due to high electric current densities, the microheaters of such a thickness are subject to recrystallization processes leading to a progressive change in their resistivity and, finally, to their burnout. Besides, the sensitive elements proposed by the inventors of US 2002/0118027 A1 are not optimized with respect to mass and heat transfer and, similar to the pellistor-type sensors produced by 3D techniques, lose their sensitivity over time (the so-called natural ageing), though to a lesser degree, and suffer from poisoning by catalyst poisons.

Another type of planar sensor chosen as a closest prior art (prototype) is known and is described in the Russian patent No. RU 2447426 of Oct. 4, 2012 (Karpov E. E. et al., Method and apparatus for detecting pre-explosive concentrations of methane in air). In this solution, similar to the prior art [US 2002/0118027 A1], the use of micron-size product formation methods approved in the microelectronics technologies is the defining factor.

The sensor obtained therein, in addition to a lower power consumption and the identity of sensitive elements, is optimized with respect to heat transfer of the microheater being a thermistor (a measuring microheater).

However, the optimization of mass transfer enables energy saving only, but it does not solve in any way the problems of stability enhancement and reduction in sensor poisoning with catalyst poisons.

DISCLOSURE OF THE INVENTION

An object of the present invention is to improve the design both of sensitive elements (SE) and of the thermocatalytic sensor as a whole in order to improve the sensitive elements parameters (a reduced power consumption, a higher sensitivity, a lower inertance, reproducibility of identical properties of the SEs produced) and the sensor characteristics associated with an enhanced stability and a reduced effect of catalyst poisons.

A technical result achieved by the present invention consists in an improvement of the sensitive elements parameters and the sensor characteristics associated with stability and resistance to catalyst poisons.

This object is solved by a microchip of a planar thermocatalytic sensor of combustible gases and vapours, the microchip comprising an anodic aluminium oxide porous substrate common for a working sensitive element and a reference sensitive element, said substrate having a platinum thin-film structured coating arranged thereon portions of which located on opposite sides of the substrate and shaped as a meander serve as measuring microheaters and allow for heating active zones of the microchip up to working temperatures and for differentially measuring an output signal, wherein dimensions of the measuring microheaters are limited to values at which a film-wise mode of heat removal is provided.

The best embodiment of the invention is implemented when the platinum measuring microheaters are made to have dimensions of from 25 to 300 μm in lateral directions and a thickness of from 100 to 1000 nm, a distance of not less than 2.5 mm between the measuring microheaters, a thickness of the structured coatings from 100 to 1000 nm, and a thickness of the porous substrate from 10 to 80 μm, wherein films of anodic aluminium oxide (AAO) with regular pores which ensure a predominantly molecular gas diffusion mode and have a diameter from 100 to 350 nm may be used as the porous substrate.

The measuring microheaters may be located on arms protruding out of the common substrate configuration and may be separated from a central part of the substrate by process holes made in the porous substrate near the measuring microheaters in order to decrease the heat removal from heated portions of the microchip and also to prevent precursors from spreading over a surface of the AAO substrate during deposition of a catalytically active layer in the microchip manufacturing process.

The above object is solved by that a planar thermocatalytic sensor of combustible gases and vapours includes a housing having a unilateral diffusion access of a gas mixture to be analyzed, inside which a buffer chamber and a reaction chamber having the microchip are arranged along a gas flow path, wherein the buffer chamber is provided with a gas-exchange filter on the inlet side thereof, and wherein the reaction chamber is provided with a calibrated orifice which restricts the flow of the fluid to be analyzed from the buffer chamber to the reaction chamber.

The gas-exchange filter and the buffer chamber allow for ripple smoothing of a turbulent external flow and for transforming the turbulent external flow into a laminar flow. The calibrated orifice has a diameter from 50 to 1000 μm, and a maximal gas access therethrough turns to be less than the microchip performance (i.e., an oxidation rate of the combustible gas over a catalytically active layer) at free access of the gas-air mixture. The working chamber is composed of a glass-metal header with current-carrying risers and of a metallic cap having a calibrated orifice, wherein the microchip is fixed onto the header by means of a ceramic support, and contact pads of the microchip and the current-carrying risers are connected to each other by microwelding with a gold wire having a diameter of from 10 to 50 μm. The housing of the sensor has a cylindrical shape, and the chambers and the elements contained therein are positioned coaxially with the housing of the sensor.

Thus, the above object of the invention is solved by way of rejecting the conventional manufacture technique of the reference and working sensitive elements as separate pieces while using at the same time a controlled mass transfer of combustible components of the gas-air mixture to the aligned reaction chamber.

This is achieved by means of that the reaction chamber of the sensor is formed to have a restrictive calibrated orifice which decreases the diffusion flow of the gas mixture to be analyzed from the buffer chamber to the reaction chamber, wherein the working and reference sensitive elements are arranged on the common substrate made of anodic aluminium oxide, thus forming a single structure of the sensitive elements (a microchip), wherein geometric sizes of the measuring microheaters are minimized down to values (less than 300 μm in lateral directions and 1 μm in thickness) which ensure a film-wise mode of heat transfer, and wherein the regular pores in the substrate of the microchip are increased up to diameters which ensure the predominantly molecular diffusion mode in the pores (100 nm or higher).

The platinum-containing measuring microheaters which are comprised in the microchip and which allow for heating the working and reference sensitive elements up to working temperatures and for differentially measuring an output signal in a measuring bridge circuit are spaced apart at opposite sides of the microchip and are placed on arms protruding out of the common microchip configuration.

BRIEF DESCRIPTION OF DRAWINGS

The gist of the invention is explained in more detail below with reference to the drawings and plots where.

Figure 1:
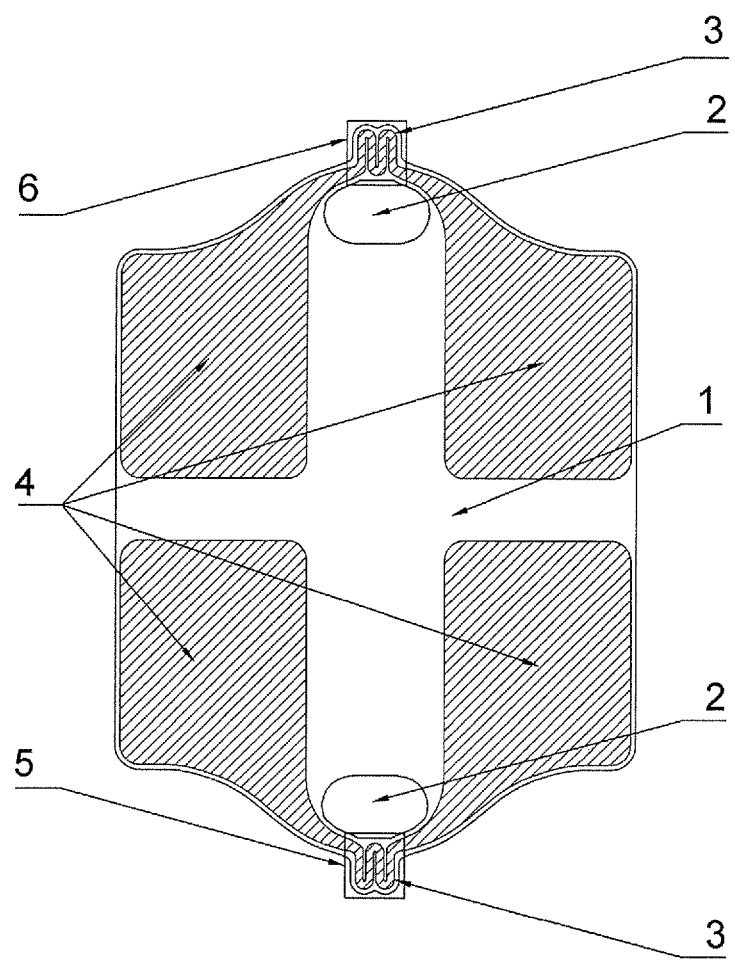
FIG. 1 shows a microchip structure having a working and reference sensitive elements arranged on a single porous substrate made of anodic aluminium oxide.

The following components are denoted by reference numerals in the drawings:

1 a porous substrate made of anodic aluminium oxide;
2 through holes separating the arms from the microchip body;
3 measuring microheaters;
4 contact pads;
5 a working sensitive element;
6 a reference sensitive element;
7 a microchip;
8 a support for the microchip;
9 a TO-5 base;
10 a reaction chamber cup with an orifice;
11 an orifice restricting the diffusion flow;
12 current lead wires;
13 a housing;
14 a gas-exchange filter;
15 a buffer chamber;
16 a reaction chamber;
17 a bushing;
18 a sealing layer.

Design concepts and the gist of the present invention are presented in FIGS. 1-5.

Figure 3:
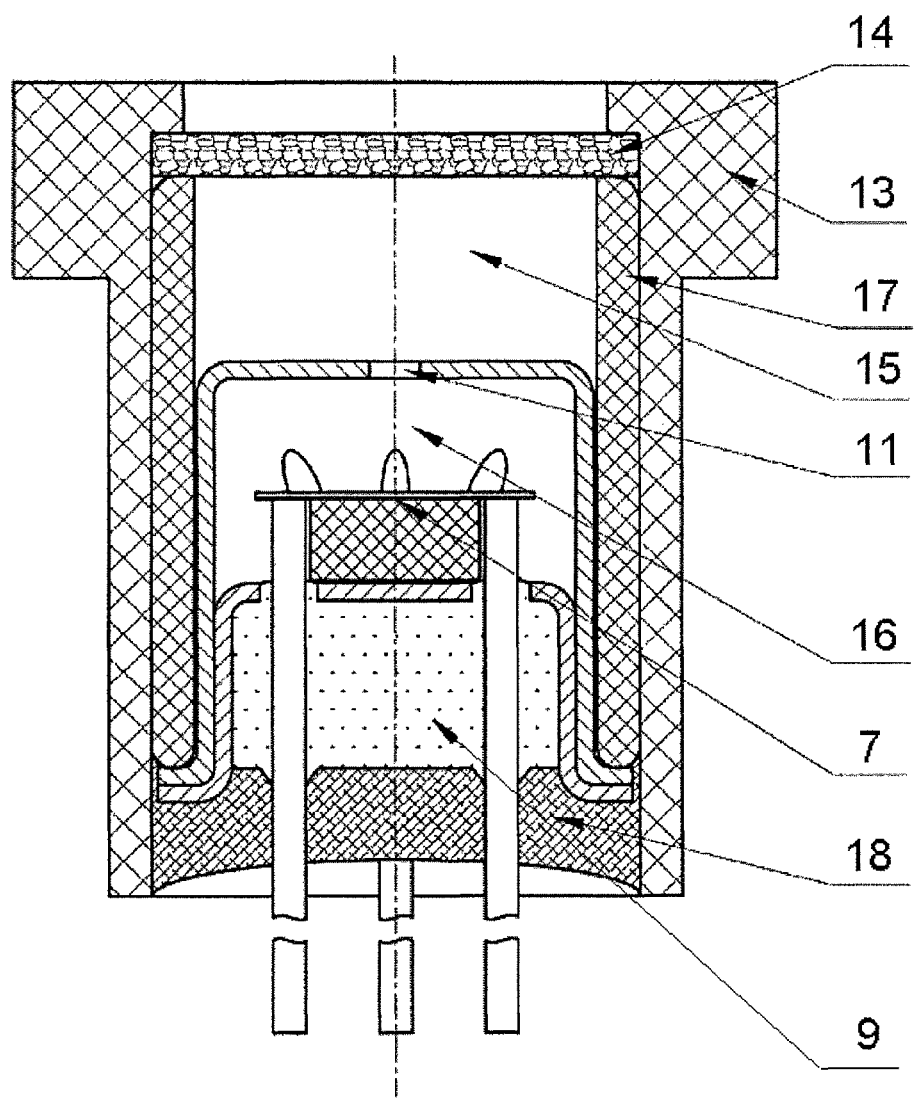
FIG. 3 shows a cross-sectional view of the sensor structure.

The sensor structure shown in FIG. 3 includes a housing (13) within which all structural components of the sensor are accommodated. A gas-exchange filter (14) is installed at an inlet to an internal cavity of the sensor, through the pores of which filter a gas mixture to be analyzed reaches a buffer chamber (15) from where, in turn, passes through a calibrated orifice (11) into a reaction chamber (16). Inside the reaction chamber, a microchip is mounted on a current conducting header (9). A ratio of volumes of the reaction chamber and of the buffer chamber is defined by a bushing (17). At the end, the sensor is sealed with a gas-tight substance (a sealing layer) (18).

Figure 2:
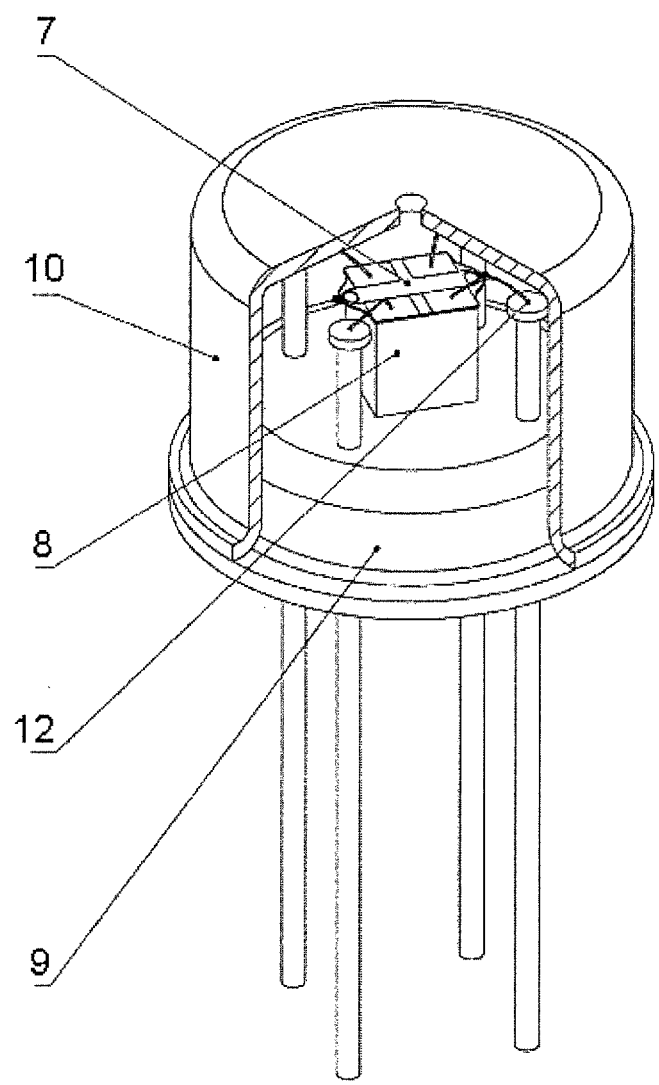
FIG. 2 shows a structure of the reaction chamber provided with the microchip.

An assembly drawing of the reaction chamber provided with the microchip is shown in FIG. 2 where: (7) denotes the microchip, (8) denotes the support for the microchip, (9) denotes the TO-5 header whose mass production is performed by the MARS plant (city of Torzhok in Russia), (10) denotes the reaction chamber cap with a calibrated orifice, and (12) denotes the current lead wires.

EMBODIMENTS OF THE INVENTION

A main component of the planar thermocatalytic sensor is a microchip produced according to thin-film techniques (FIG. 1), said microchip being composed of a thin porous substrate (1) made of an anodic aluminium oxide film having a thickness of 30 μm, onto which platinum thin-film (300-1000 nm thick) structured coatings (shown as shaded areas in FIG. 1) are applied by vacuum deposition, i.e., two measuring microheaters (3) in the form of a meander, current lead wires to the microheaters, and contact pads (4).

In turn, main components of the microchip are the two identical measuring microheaters (3) any one of which may function as the measuring microheater of either a working element (5) or a reference sensitive element (6), depending on which of them has been coated with a catalytically active layer.

During experiments performed, a high reproducibility of the identical configuration sensitive elements and of resistances of the measuring microheaters produced by a collective process according to microelectronic technologies has been confirmed; all this has pushed the present inventors to give up using the conventional separate fabrication of the working and reference sensitive elements differing from each other in mass, in sizes and in resistance of the measuring microheaters.

Main parameters of the sensors are: microchip dimensions of 2.1×3.2 mm, sizes of a heated zone of 198×224 μm (marked by dashed line in FIG. 1), a distance between the heated zones of the working and reference sensitive elements of 2.6 mm. The heated zone is dimensioned so as to minimize the sizes to values at which a convection component of heat removal is avoided and, hence, sensor readings are independent of the SEs spatial position, while ensuring maintenance of a sufficient strength of cross-arms with current lead wires connecting the arms to a central part of the substrate made of anodic aluminium oxide. The distances between the heated zones of the working and reference SEs are chosen so as to be optimal in heat exchange between the SE microheaters, i.e., a minimum distance at which changes in the temperature of the working SE due to the combustible component oxidation do not affect the temperature of the reference SE.

The sensor reaction chamber (16) shown in FIGS. 2 and 3 and having the microchip (7) of FIG. 1 positioned inside thereof is implemented on the basis of a typical housing structure for the TO-5 electronic components, which is mass produced by the MARS plant (city of Torzhok, Tver region, Russia) and is composed of a glass-metal header (9) and a metallic cap (10). The microchip is fixed on a ceramic support (8), contact pads of the microchip and current-carrying risers of the TO-5 header are connected to each other by microwelding with a gold wire (12) having a diameter of 25 μm.

After the microchip is fixed on the header, the microchip is covered by the cap (10) which has an orifice (11) restricting the diffusion access of the gas-air mixture to the interior volume of the reaction chamber (16). The cap is soldered or glued to the header so as to ensure a tight connection.

In turn, the reaction chamber having the microchip positioned inside (FIG. 2) is installed in the sensor housing (13) shown in FIG. 3.

When combining the working and reference sensitive elements in a single structural component, an indicator of the principal viability of this technical solution is a thermal interference of the sensitive elements. In order to experimentally evaluate the interference of the sensitive elements, tests were performed to determine a signal dependence on the sensor angular position in the range of 0-360° (angles of 0°, 180° and 360° correspond to a horizontal position of the planar sensitive element in space). The test results are summarized in Table 1.

TABLE 1

| Measured methane concentration vs sensor slope angle in pure air and in a control gas mixture with a methane content of 1 vol. %. | | | | | | | | | |
|---|---|---|---|---|---|---|---|---|---|
| Slope angle [degrees] | 0 | 45 | 90 | 135 | 180 | 225 | 270 | 315 | 360 |
| Methane concentration measured at 0 vol. % $CH_4$, [vol. % of $CH_4$] | 0.00 | 0.04 | 0.08 | 0.03 | −0.01 | 0.04 | 0.07 | 0.04 | 0.00 |
| Methane concentration measured at 1 vol. % $CH_4$, [vol. % of $CH_4$] | 1.00 | 1.05 | 1.08 | 1.04 | 0.98 | 1.04 | 1.08 | 1.04 | 1.00 |

The data presented in Table 1 demonstrate that a deviation of the measured methane concentrations both in pure air and in the control gas mixture containing 1 vol. % $CH_4$ does not exceed 0.08 vol. %. This value is less than the maximum allowable deviation of 0.1 vol. % $CH_4$ specified by the Russian State Standard [GOST P 52350.29.1-2010 (IEC 60079-29-1:2007) Gas detectors—Performance requirements of detectors for flammable gases]. Consequently, it may be concluded that the interference of the working (5) and reference (6) sensitive elements disposed on the single substrate in the single housing is negligible.

Figure 4:
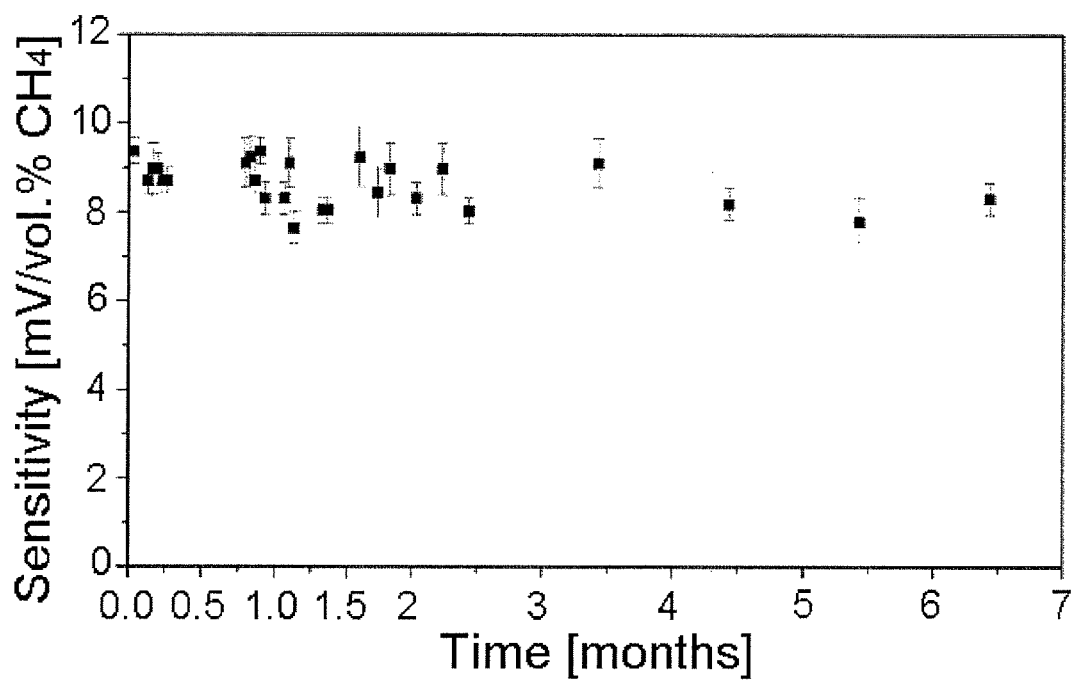
FIG. 4 shows a sensitivity vs time dependence curve of the thermocatalytic sensors operating in static mode at a restricted access of the gas mixture through the calibrated orifice having a diameter d=0.7 mm.

The presence of the flow restriction orifice (11) in the cap of the reaction chamber (10) enables to decrease several times (2 to 2.5 times in the present case of the orifice diameter d=0.7 mm) the diffusion flow of the gas-air mixture in comparison with the case of free diffusion access (see the relationship of sensitivities in the beginning of the test in FIG. 4), which, according to the thermocatalytic sensor tests carried out for more than six months of continuous operation, facilitates a significant increase in the output signal stability. The observed effect of increasing the sensor stability (at the restricted diffusion flow of the gas mixture to be analyzed into the reaction chamber) is caused by the following:

a) A high performance of the working sensitive element in combination with the restricted diffusion access of the gas mixture to be analyzed to the reaction chamber facilitates the creation of mild operating conditions for catalyst active sites—at a low concentration of the combustible component—and prevents the formation of gas overloads.

b) Due to an extremely high value of the internal surface area of the pores in the working sensitive element where the catalyst active sites are located, at the beginning of the sensor operation these active sites are redundant and only sites that are disposed nearby pore openings are involved. As the catalyst ages during usage, the sensitivity of the sensor remains stable due to a progressive propagation of flameless oxidation processes of the gaseous environment combustible components to all active sites of the catalyst (along the whole length of a pore).

The long-term test results for a group of eight sensors are presented in FIG. 4. An average sensitivity when measured at 1 vol. % $CH_4$ in air is shown in the figure. As an error, a standard deviation in the group of sensors is presented. The results obtained are evidence of that a decrease in the long-term sensitivity is lower than the values specified by the Russian and International standards for thermocatalytic sensors [GOST P 52350.29.1-2010 (IEC 60079-29-1:2007) Gas detectors—Performance requirements of detectors for flammable gases].

The experiments have also shown that the diffusion flow restriction facilitates not only the sensitivity stabilization but also a reduction in the rate of poisoning the thermocatalytic sensors with catalyst poisons.

Figure 5:
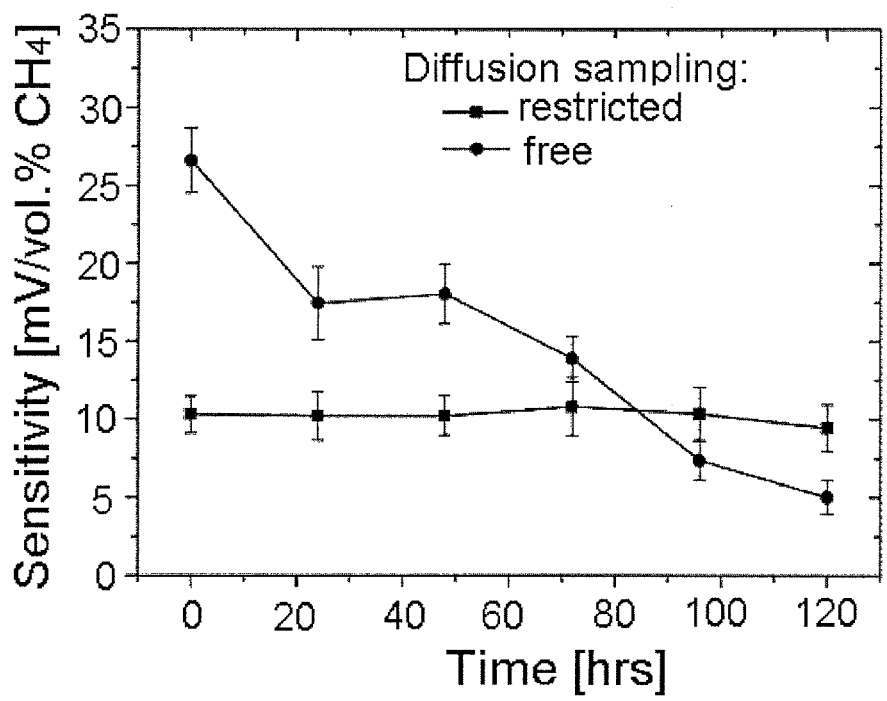
FIG. 5 shows an effect of catalyst poisons upon a change in the sensitivity of the sensor having the restricted diffusion access and the free access. The measurements were performed at a methane concentration in air of 1 vol. % and at a hexamethyldisiloxane content of 500 ppm.

FIG. 5 shows sensitivity evolution plots for sensors having a restricted access (via a restrictive calibrated orifice) and free access of a methane-air mixture to be analyzed at 1 vol. % $CH_4$ and at a "poison" (hexamethyldisiloxane) concentration of 500 ppm. Such poison concentration is 50 times higher than the concentration specified for normal conditions of the sensor operation, whereby a process of poisoning the sensitive element can be accelerated. The test results demonstrate that the location of sensitive elements in the reaction chamber having the restricted diffusion access diminishes an influence of the poison on the sensor sensitivity and ensures the sensitivity invariability in spite of the poisoning process, as can be easily seen from comparison with the sensitivity change for the sensor having the free diffusion access.

The invention claimed is:

1. A microchip of a planar thermocatalytic sensor of combustible gases and vapours, the microchip comprising an anodic aluminum oxide porous substrate with a working sensitive element and a reference sensitive element arranged thereon, said substrate having platinum coatings arranged thereon portions of which located on opposite sides of the substrate and shaped as a meander serve as measuring microheaters and allow for heating active zones of the microchip up to working temperatures and for differentially measuring an output signal.

2. The microchip according to claim 1, characterized in that the platinum measuring microheaters have dimensions from 25 to 300 µm in lateral directions and a thickness from 100 to 1000 nm.

3. The microchip according to claim 1, characterized in that anodic aluminum oxide films with pores which allow for a molecular gas diffusion mode and have a pore diameter from 100 to 350 nm are used as the porous substrate.

4. The microchip according to claim 1, characterized in that the porous substrate has a thickness from 10 to 80 µm.

5. The microchip according to claim 1, characterized in that a distance between the measuring microheaters is not less than 2.5 mm.

6. The microchip according to claim 1, characterized in that the coatings are made to have a thickness of 100-1000 nm.

7. The microchip according to claim 1, characterized in that the measuring microheaters are arranged on arms protruding out of the substrate, and are separated from a central part of the substrate by process holes.

8. The microchip according to claim 7, characterized in that the process holes in the porous substrate are formed in areas of the substrate between the measuring microheaters and contact pads of the microchip to decrease the heat removal from heated portions of the microchip and also to prevent precursors from spreading over a surface of the anodic aluminium oxide substrate during deposition of an catalytically active layer in the microchip manufacturing process.

9. A planar thermocatalytic sensor of combustible gases and vapours, said sensor comprising a housing having a unilateral diffusion access of a gas mixture to be analyzed, inside which a buffer chamber and a reaction chamber having the microchip according to claim 1 are arranged along a gas flow path, wherein the buffer chamber is provided with a gas-exchange filter on the inlet side thereof, and the reaction chamber is provided with a calibrated orifice which restricts the fluid flow to be analyzed from the buffer chamber to the reaction chamber.

10. The sensor according to claim 9, characterized in that the gas-exchange filter and the buffer chamber allow for ripple smoothing of a turbulent external flow and for transforming the turbulent external flow into a laminar flow.

11. The sensor according to claim 9, characterized in that the calibrated orifice has a diameter from 50 to 1000 µm and a maximal gas access therethrough turns to be less than the oxidation rate of the combustible gas to be analyzed on a catalytically active layer surface in the case of free access of the gas-air mixture.

12. The sensor according to claim 9, characterized in that the reaction chamber is composed of a glass-metal header with current-carrying risers and a metallic cap having the calibrated orifice, wherein the microchip is fixed to the header by means of a ceramic support, and contact pads of the microchip and the current-carrying risers are connected to each other by microwelding with a gold wire having a diameter of from 10 to 50 µm.

13. The sensor according to claim 9, characterized in that the housing of the sensor has a cylindrical shape, and the chambers and the working and reference sensitive elements contained therein are positioned coaxially to the housing of the sensor.

* * * * *